United States Patent
Liu et al.

(10) Patent No.: US 11,943,198 B2
(45) Date of Patent: Mar. 26, 2024

(54) METHOD FOR IMPLEMENTING MULTIPLE PDNs BETWEEN INDOOR UNIT AND OUTDOOR UNIT, AND STORAGE MEDIUM

(71) Applicant: ZTE CORPORATION, Shenzhen (CN)

(72) Inventors: Chuan Liu, Shenzhen (CN); Zhonghui Che, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/999,462

(22) PCT Filed: Jun. 16, 2021

(86) PCT No.: PCT/CN2021/100409
§ 371 (c)(1),
(2) Date: Nov. 21, 2022

(87) PCT Pub. No.: WO2022/001668
PCT Pub. Date: Jan. 6, 2022

(65) Prior Publication Data
US 2023/0208805 A1   Jun. 29, 2023

(30) Foreign Application Priority Data
Jun. 29, 2020   (CN) .......................... 202010607390.4

(51) Int. Cl.
*H04L 61/5007* (2022.01)
*H04L 12/46* (2006.01)
(Continued)

(52) U.S. Cl.
CPC ...... *H04L 61/5007* (2022.05); *H04L 12/4641* (2013.01); *H04L 45/74* (2013.01); *H04L 61/2503* (2013.01)

(58) Field of Classification Search
CPC . H04L 12/4641; H04L 45/74; H04L 61/2503; H04L 61/5007
(Continued)

(56) References Cited

U.S. PATENT DOCUMENTS

2009/0067441 A1* 3/2009 Ansari ................ H04L 12/2814
                                                        370/401
2010/0002694 A1   1/2010 Matsukawa et al.
(Continued)

FOREIGN PATENT DOCUMENTS

CN   101383787 A    3/2009
CN   108632953 A   10/2018
(Continued)

OTHER PUBLICATIONS

International Searching Authority. International Search Report and Written Opinion for PCT Application No. PCT/CN2021/100409 and English translation, dated Sep. 7, 2021, pp. 1-9.
(Continued)

*Primary Examiner* — David P Zarka
(74) *Attorney, Agent, or Firm* — Vivacqua Crane, PLLC

(57) ABSTRACT

A method for implementing multiple PDNs between an indoor unit and an outdoor unit may include: allocating at least two first VLAN interfaces to a first physical network interface; establishing packet data network (PDN) data channels which are in one-to-one correspondence with the first VLAN interfaces, wherein the PDN data channels are configured for data interaction with a base station; acquiring address allocation requests corresponding to the PDN data channels from the IDU; and allocating first IP addresses corresponding to the PDN data channels to the IDU according to the address allocation requests, such that data messages from the IDU are routed to the corresponding PDN data channels according to the first IP addresses.

7 Claims, 12 Drawing Sheets

(51) Int. Cl.
  *H04L 45/74*     (2022.01)
  *H04L 61/2503*   (2022.01)
(58) Field of Classification Search
  USPC ......................................................... 709/245
  See application file for complete search history.

(56) References Cited

U.S. PATENT DOCUMENTS

| | | |
|---|---|---|
| 2011/0283013 A1 | 11/2011 | Grosser et al. |
| 2014/0355445 A1* | 12/2014 | Dong .................... H04L 47/125 |
| | | 370/235 |
| 2015/0372901 A1* | 12/2015 | Pacella ................... H04L 45/12 |
| | | 370/225 |
| 2018/0288229 A1 | 10/2018 | Lasso et al. |
| 2019/0109814 A1* | 4/2019 | Yin ..................... H04L 61/5014 |

FOREIGN PATENT DOCUMENTS

| | | |
|---|---|---|
| CN | 109548009 A | 3/2019 |
| WO | 2016036287 A1 | 3/2016 |

OTHER PUBLICATIONS

European Patent Office. Extended European Search Report for EP Application No. 21834236.8, dated Sep. 12, 2023, pp. 1-7.

* cited by examiner

Allocate, according to the address allocation requests, first private network IP addresses corresponding to the PDN data channels to the IDU, such that data messages from the IDU are routed to corresponding first VLAN interfaces according to the first private network IP addresses — S600

Fig. 6

Send public network IP address allocation requests to the base station — S710

Acquire first public network IP addresses allocated by the base station according to the public network IP address allocation requests — S720

Configure the first public network IP addresses for the WAN interfaces — S730

Configure routing policies for the first VLAN interfaces and add Source Network Address Translation (SNAT) rules to data messages from the first VLAN interfaces, such that the data messages from the first VLAN interfaces are routed to corresponding WAN interfaces, where the SNAT rules are used to translate source network addresses of the data messages from the first VLAN interfaces into the first public network IP addresses — S740

Fig. 7

METHOD FOR IMPLEMENTING MULTIPLE PDNs BETWEEN INDOOR UNIT AND OUTDOOR UNIT, AND STORAGE MEDIUM

CROSS-REFERENCE TO RELATED APPLICATION

This application is a national stage filing under 35 U.S.C. § 371 of international application number PCT/CN2021/100409, filed Jun. 16, 2021, which claims priority to Chinese patent application No. 202010607390.4, filed Jun. 29, 2020. The contents of these applications are incorporated herein by reference in their entirety.

TECHNICAL FIELD

Embodiments of the present disclosure relate to, but are not limited to, the technical field of communication, and more particularly, to a method for implementing multiple PDNs between an indoor unit and an outdoor unit, an outdoor unit, an indoor unit, and a computer readable storage medium.

BACKGROUND

With the development of mobile communication, in order to ensure the signal intensity and signal stability, Indoor Units (IDU) and Outdoor Units (ODU) are increasingly favored by major operators. With the continuous change of network topology, there are more and more demands for multiple Packet Data Networks (PDN), mainly due to the following two reasons. First, in order to reduce operation and maintenance costs, operators gradually adopt remote management devices. However, remote management may easily consume users' traffic, so that the operators adopt an independent PDN, which is free of charge. Second, at present, most Mobile Broadband (MBB) products need to support Voice Over Internet Protocol (VOIP) or Voice Over Long-Term Evolution (VoLTE), in order to ensure call quality, operators generally adopt an independent Access Point Name (APN) to ensure the Quality of Service (QOS). Therefore, based on the above two reasons, there may be more and more demands for multiple PDNs. However, the existing IDU and ODU are mostly connected by a Registered Jack (RJ) 45 interface, so it is difficult to implement multiple PDN connections between the two units.

SUMMARY

The following is an overview of the subject described in detail herein. This overview is not intended to limit the scope of protection of the claims.

Embodiments of the present disclosure provide a method for implementing multiple PDNs between an Indoor Unit (IDU) and an Outdoor Unit (ODU), an ODU, an IDU, and a computer readable storage medium.

In accordance with an aspect of the present disclosure, an embodiment provides a method for implementing multiple PDNs between an IDU and an ODU, which is applied to the ODU. The method may include: allocating at least two first VLAN interfaces to a first physical network interface; establishing PDN data channels in one-to-one correspondence with the first VLAN interfaces, where the PDN data channels are configured for data interaction with a base station; acquiring address allocation requests corresponding to the PDN data channels from the IDU; and allocating first IP addresses corresponding to the PDN data channels to the IDU according to the address allocation requests, such that data messages from the IDU are routed to the corresponding PDN data channels according to the first IP addresses.

In accordance with an aspect of the present disclosure, an embodiment further provides a method for implementing multiple PDNs between an IDU and an ODU, which is applied to the IDU. The method may include: allocating at least two second VLAN interfaces to a second physical network interface, where the at least two second VLAN interfaces are in one-to-one correspondence with at least two PDN data channels established in the ODU, and the PDN data channels are configured for data interaction with a base station; sending address allocation requests corresponding to the PDN data channels to the ODU; acquiring first IP addresses corresponding to the PDN data channels allocated by the ODU according to the address allocation requests; and routing data messages to the corresponding PDN data channels through the second VLAN interfaces according to the first IP addresses.

In accordance with an aspect of the present disclosure, an embodiment further provides an ODU. The ODU may include: a memory, a processor, and a computer program stored in the memory and executable by the processor which, when executed by the processor, causes the processor to implement the method described above.

In accordance with an aspect of the present disclosure, an embodiment further provides an IDU. The IDU may include: a memory, a processor, and a computer program stored in the memory and executable by the processor which, when executed by the processor, causes the processor to implement the method described above.

In accordance with an aspect of the present disclosure, an embodiment further provides a computer readable storage medium storing a computer executable instruction which, when executed by a processor, causes the processor to implement the methods described above.

Other features and advantages of the present disclosure will be set forth in the following description, and partly become apparent from the description, or understood by implementing the present disclosure. The objects and other advantages of the present disclosure may be realized and obtained by the structure particularly pointed out in the description, claims and drawings.

BRIEF DESCRIPTION OF DRAWINGS

The drawings are provided for a further understanding of the technical schemes of the present disclosure and constitute a part of the description. The drawings and the embodiments of the present disclosure are used to illustrate the technical schemes of the present disclosure and do not constitute a limitation to the technical schemes of the present disclosure.

FIG. 6 is a flowchart of a method for implementing multiple PDNs between an IDU and an ODU provided by another embodiment of the present disclosure;

FIG. 7 is a flowchart of a method for implementing multiple PDNs between an IDU and an ODU provided by another embodiment of the present disclosure;

DETAILED DESCRIPTION

In order to make the objects, technical schemes and advantages of the present disclosure clear, the present disclosure will be further described in detail with reference to the drawings and embodiments. It should be understood that the embodiments described here are only used to illustrate the present disclosure, and are not intended to limit the present disclosure.

It should be noted that although functional modules have been divided in the schematic diagrams of the apparatus, and logical orders have been shown in the flowcharts, in some cases, the modules may be divided in a different manner, or the steps shown or described are executed in an order different from the orders as shown in the flowcharts. The terms "first", "second" and the like in the description, the claims, and the accompanying drawings are used to distinguish similar objects, and are not necessarily used to describe a specific sequence or a precedence order.

The present disclosure provides a method for implementing multiple Packet Data Networks (PDN) between an Indoor Unit (IDU) and an Outdoor Unit (ODU), an ODU, an IDU, and a computer readable storage medium. The IDU may allocate multiple VLAN interfaces to its own RJ45 interface. The ODU may allocate multiple VLAN interfaces to its own RJ45 interface, and at the same time, the ODU may establish PDN data channels that are in one-to-one correspondence with the VLAN interfaces allocated, where the PDN data channels are configured for data interaction with a base station. After the IDU sends address allocation requests corresponding to the PDN data channels to the ODU, the ODU may allocate IP addresses corresponding to the PDN data channel to the IDU according to the address allocation requests. Then, the IDU may route data messages to the corresponding PDN data channels through its own VLAN interfaces according to the IP addresses and then route the data messages to the base station through the PDN data channels. For this technical scheme, the ODU may establish multiple PDN data channels, and the data messages of the IDU may be routed to corresponding PDN data channels in the ODU according to different IP addresses and then routed to the base station through the PDN data channels. Therefore, the present disclosure can realize multiple PDN connections between the IDU and the ODU with one physical network interface.

The embodiments of the present disclosure will be further illustrated with reference to the accompanying drawings.

Figure 1:
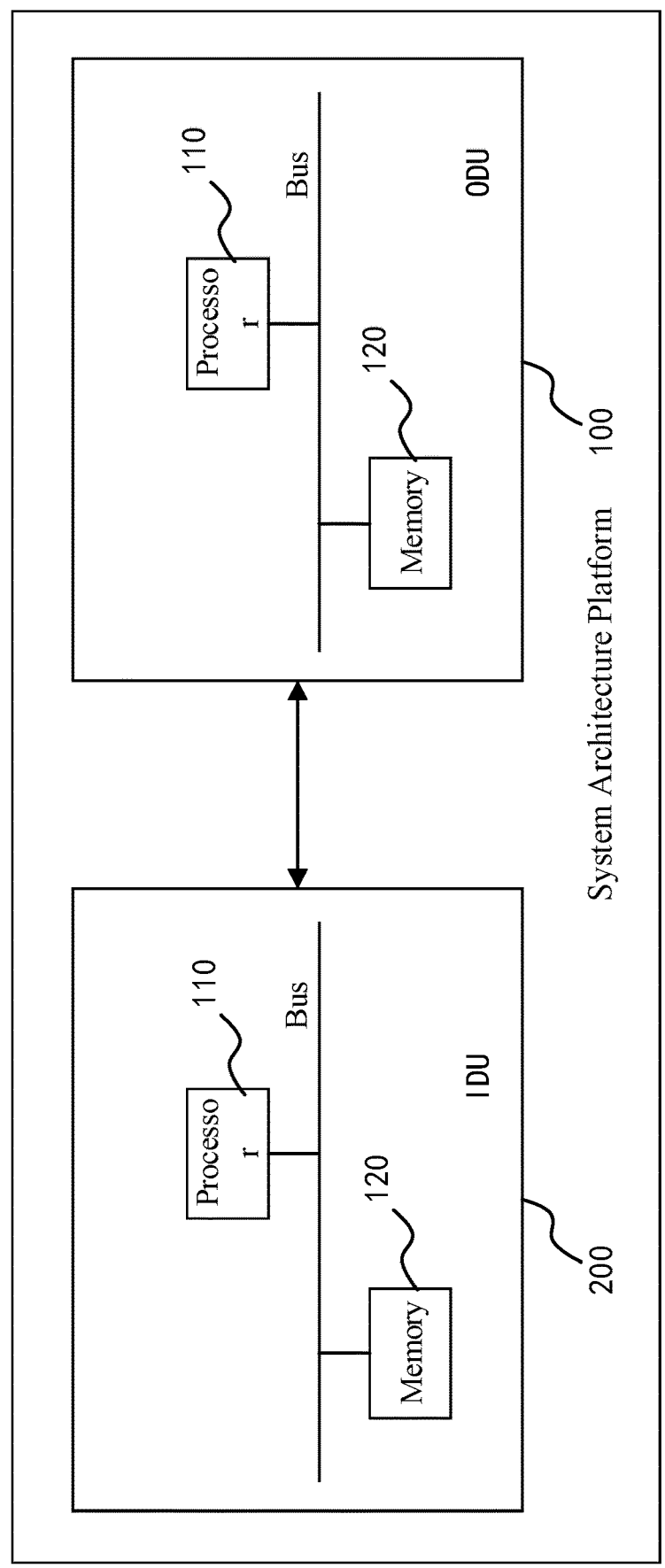
FIG. 1 is a schematic diagram of a system architecture platform for performing a method for implementing multiple PDNs between an indoor unit (IDU) and an outdoor unit (ODU) provided by an embodiment of the present disclosure.

As shown FIG. 1, FIG. 1 is a schematic diagram of a system architecture platform for performing a method for implementing multiple PDNs between an IDU and an ODU provided by an embodiment of the present disclosure.

In an embodiment in FIG. 1, the system architecture platform includes an ODU 100 and an IDU 200, each of which is provided with a memory 120 and a processor 110. The memory 120 and the processor 110 may be connected by a bus or other means, and connection by a bus is taken as an embodiment in FIG. 1.

The memory 120, as a non-transient computer readable storage medium, may be used to store non-transient software programs and non-transient computer executable programs. In addition, the memory 120 may include a high-speed random-access memory, and may also include a non-transient memory, such as at least one magnetic disk storage device, a flash memory device, or other non-transient solid state storage device. In some implementations, the memory 120 may include memories remotely located with respect to the processor 110, and these remote memories may be connected to the system architecture platform through networks. Examples of the above networks include, but are not limited to, the Internet, an intranet, a local area network, a mobile communication network and combinations thereof.

In some embodiments, in this field, in order to ensure the signal intensity and signal stability, the IDU 200 and ODU 100 are increasingly favored by major operators. With the continuous change of network topology, there are more and more demands for multiple PDNs, mainly due to the following two reasons. First, in order to reduce operation and maintenance costs, operators gradually adopt remote management devices. However, remote management may easily consume users' traffic, so that the operators adopt an independent PDN, which is free of charge. Second, at present, most Mobile Broadband (MBB) products may support Voice Over Internet Protocol (VOIP) or Voice Over Long-Term Evolution (VoLTE), in order to ensure call quality, operators generally adopt an independent Access Point Name (APN) to ensure the Quality of Service (QOS). Therefore, based on the above two reasons, there may be more and more demands for multiple PDNs. However, the existing IDU 200 and ODU 100 are mostly connected by an RJ45 interface, so it is difficult to implement multiple PDN connections between the two units.

However, current MBB products are mostly composed of main processors and wireless modules, and for multiple APNs, two schemes are mostly adopted. One is that most of these products have multiple physical channels, for example, most of them have multiple RJ45 interfaces. If there are multiple APNs, all channels are in one-to-one correspondence with corresponding physical channels. The other is to connect directly by a Universal Serial Bus (USB). In this case, most main processors are used for data services, and are used for user Local Area Network (LAN) and Wireless Local Area Network (WLAN) access. Services such as TR069 and VOIP inside other devices may run in the wireless modules without extending multiple channels. For the products of the IDU 200 and ODU 100, the products are positioned that the ODU 100 only processes the wireless communication protocol stack, and various services such as data service, device management and VOIP are run on the IDU 200, so the above two schemes cannot be directly used.

Therefore, in view of the above, in the system architecture platform provided by the example in FIG. 1, the IDU 200 may allocate multiple second VLAN interfaces to its own second physical network interface. The ODU 100 may allocate multiple first VLAN interfaces to its own first physical network interface, and at the same time, the ODU 100 may establish PDN data channels that are in one-to-one correspondence with the first VLAN interfaces, where the PDN data channels are configured for data interaction with a base station. After the IDU 200 sends address allocation requests corresponding to the PDN data channels to the ODU 100, the ODU 100 may allocate first IP addresses corresponding to the PDN data channels to the IDU 200 according to the address allocation requests, and the IDU 200 may route data messages to the corresponding PDN data channels through its own second VLAN interfaces according to the first IP addresses and then route the data messages to the base station through the PDN data channels. For this technical scheme, the ODU 100 may establish multiple PDN data channels, and the data messages of the IDU 200 may be routed to corresponding PDN data channels in the ODU 100 according to different IP addresses and then routed to the base station through the PDN data channels. Therefore, the present disclosure can implement multiple PDN connections between the IDU 200 and the ODU 100 with one physical network interface.

Those having ordinary skills in the art can understand that the system architecture platform may be applied to 3G communication network system, LTE communication network system, 5G communication network system, subsequent evolved mobile communication network system and the like, which will be not specifically limited in the embodiments.

Those having ordinary skills in the art can understand that the system architecture platform shown in FIG. 1 does not constitute a limitation to the embodiments of the present disclosure and may include more or fewer components than shown, or combinations of components, or different component arrangements.

In the system architecture platform shown in FIG. 1, the processor 110 may invoke a program for implementing multiple PDNs stored in the memory 120 to perform the method for implementing multiple PDNs between the IDU 200 and the ODU 100.

Based on the above system architecture platform, various embodiments of the method for implementing multiple PDNs between an IDU and an ODU of the present disclosure are proposed below.

Figure 2:
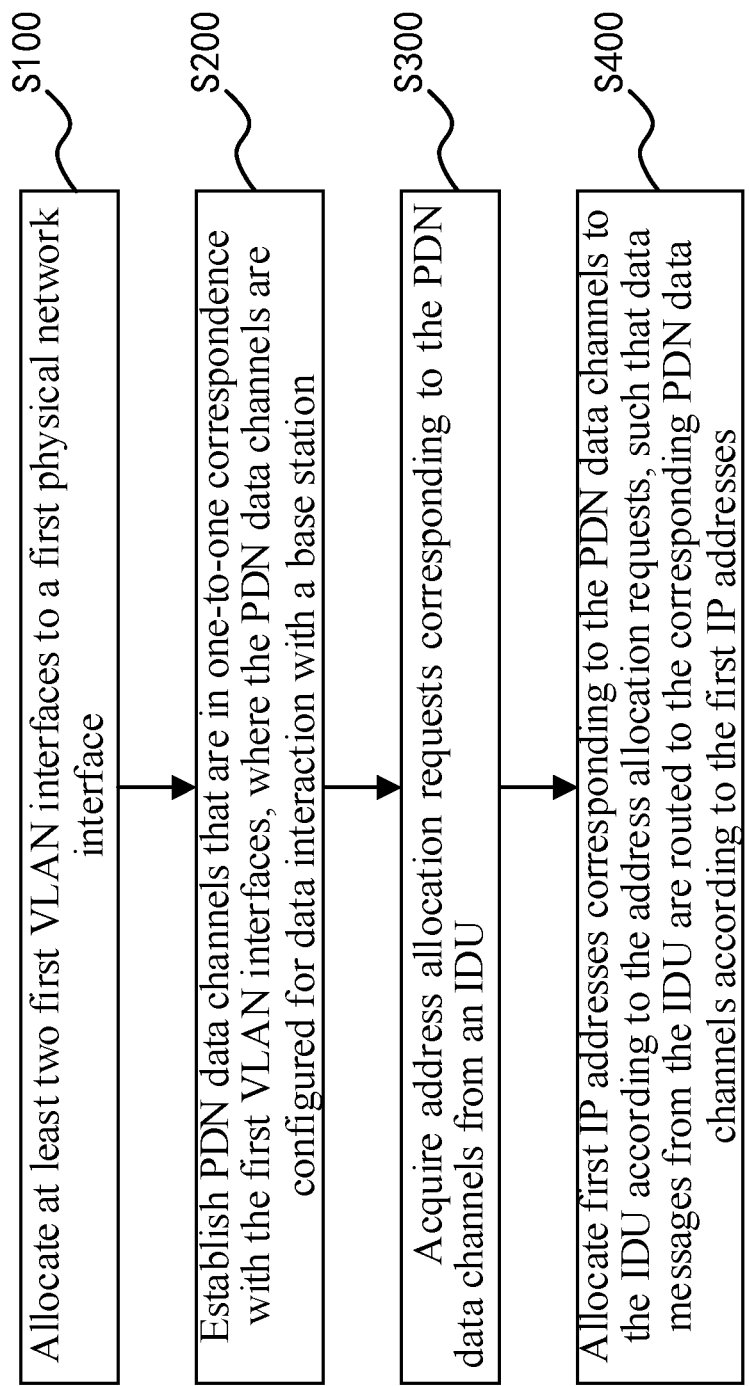
FIG. 2 is a flowchart of a method for implementing multiple PDNs between an IDU and an ODU provided by an embodiment of the present disclosure.

As shown in FIG. 2, FIG. 2 is a flowchart of a method for implementing multiple PDNs between an IDU and an ODU provided by an embodiment of the present disclosure. The method for implementing multiple PDNs between an IDU and an ODU may be applied to the ODU, which includes, but not limited to following step S100, step S200, step S300 and S400.

At S100, at least two first VLAN interfaces are allocated to a first physical network interface.

At S200, PDN data channels that are in one-to-one correspondence with the first VLAN interfaces are established, where the PDN data channels are configured for data interaction with a base station.

At S300, address allocation requests corresponding to the PDN data channels from the IDU are acquired.

At S400, first IP addresses corresponding to the PDN data channels are allocated to the IDU according to the address allocation requests, to allow data messages from the IDU to be routed to the corresponding PDN data channels according to the first IP addresses.

In an embodiment, the IDU is configured for running various application services and providing LAN or WLAN services for the downstream, to realize data processing and services, and a second physical network interface on the IDU is configured for connecting with the ODU. The ODU is configured for 2G/3G/4G wireless protocol processing and receives user data messages sent by the IDU through a first physical network interface corresponding to the second physical network interface. Then, the ODU converts the user data messages into radio waves and send the radio waves to a mobile communication base station, and converts the radio waves received from the mobile base station into user data messages and then forwards the user data messages to the IDU through the first physical network interface corresponding to the second physical network interface. In the embodiment of the present disclosure, in order to implement multiple PDN connections between the IDU and the ODU, the IDU may first virtualize its own second physical network interface into a plurality of second VLAN interfaces to perform multiple PDN connections with the ODU. In addition, the ODU may first virtualize its own first physical network interface into a plurality of first VLAN interfaces to perform multiple PDN connections with the IDU. Then, the ODU may further establish PDN data channels that are in one-to-one correspondence with the first VLAN interfaces. As the number of the first VLAN interfaces is set to be multiple, the ODU may establish multiple PDN data channels correspondingly. As the first VLAN interfaces are in one-to-one correspondence with the second VLAN interfaces, the PDN data channels are also in one-to-one correspondence with the second VLAN interfaces. After the second VLAN interfaces, the first VLAN interfaces and the PDN data channels are generated, the IDU may send address allocation requests to the ODU through the second VLAN interfaces, and the ODU may allocate first IP addresses corresponding to the PDN data channels to the second VLAN interfaces of the IDU according to the address allocation requests from the IDU. Then, data messages from the second VLAN interfaces of the IDU may be routed to the corresponding PDN data channels in the ODU according to the corresponding first IP addresses and routed to the base station through the PDN data channels. Therefore, the embodiment of the present disclosure can implement multiple PDN connections between the IDU and the ODU with one physical network interface.

It is worth noting that the second VLAN interfaces of the IDU and the first VLAN interfaces of the ODU should be divided synchronously, and corresponding tags of the first and second VLAN interfaces should be consistent. In addition, for a default data path, an untag mode is adopted, so that other devices without VLAN division can also use the default data path when being directly connected to the ODU.

It can be understood that the first physical network interface and the second physical network interface may be RJ45 interfaces on the IDU and the ODU, respectively.

Figure 3:
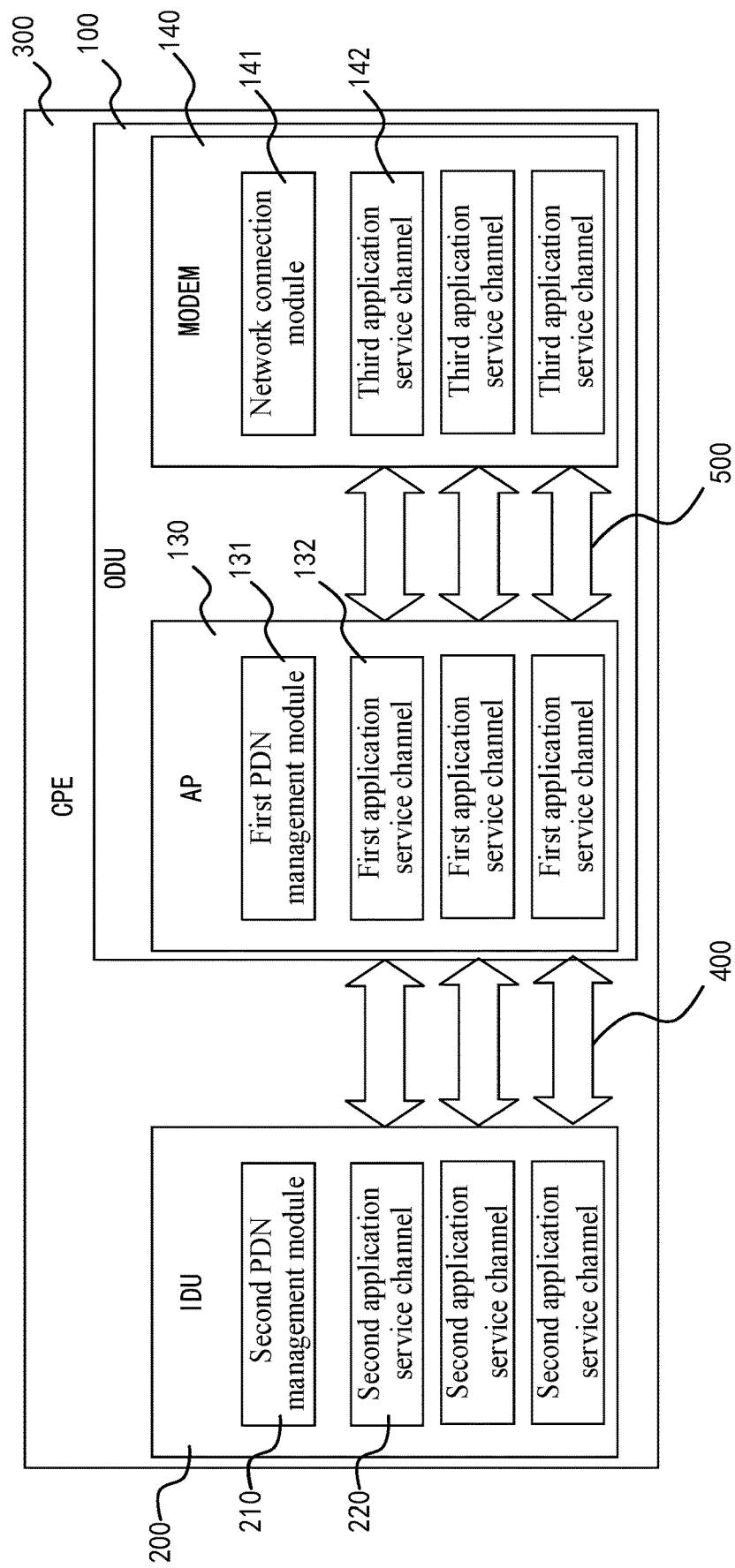
FIG. 3 is a system structural diagram of an IDU and an ODU provided by an embodiment of the present disclosure.
Figure 4:
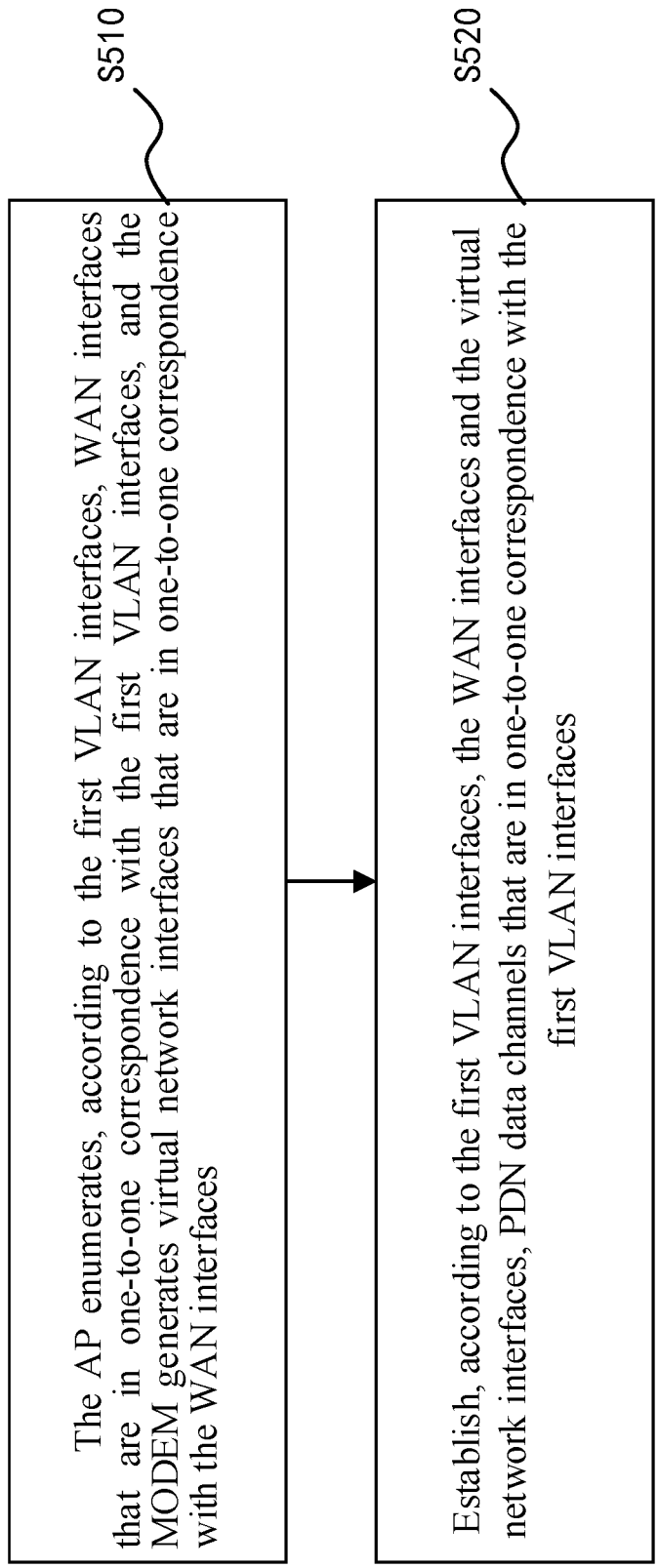
FIG. 4 is a flowchart of a method for implementing multiple PDNs between an IDU and an ODU provided by another embodiment of the present disclosure.

In addition, referring to FIG. 3 and FIG. 4, in an embodiment, the ODU 100 includes an AP 130 and a MODEM 140, the above-mentioned first physical network interface being arranged on the AP 130. The establishing PDN data channels that are in one-to-one correspondence with the first VLAN interfaces in S200 includes, but not limited to, steps S510 and S520.

At S510, according to the first VLAN interfaces, the AP enumerates WAN interfaces that are in one-to-one correspondence with the first VLAN interfaces, and the MODEM generates virtual network interfaces that are in one-to-one correspondence with the WAN interfaces.

At S520, according to the first VLAN interfaces, the WAN interfaces and the virtual network interfaces, PDN data channels that are in one-to-one correspondence with the first VLAN interfaces are established.

In an embodiment, the above-mentioned first VLAN interfaces are obtained by dividing the first physical network interface on the AP 130. The AP 130 also creates at least a plurality of WAN interfaces according to the PDN channels established with the ODU 100 and the base station, where the WAN interfaces are in one-to-one correspondence with the first VLAN interfaces. In addition, the MODEM 140 may generate a plurality of virtual network interfaces, such that the ODU 100 may establish a PDN data channel according to one first VLAN interface, and one WAN interface and one virtual network interface corresponding to the first VLAN interface. Because the first VLAN interfaces, WAN interfaces and virtual network interfaces are set to be multiple in number and are in one-to-one correspondence, the ODU 100 may establish a plurality of PDN data channels. For all PDN data channels, data messages from corresponding second VLAN interfaces on the IDU 200 may be received through the first VLAN interfaces, then routed to the WAN interfaces and virtual network interfaces through the PDN data channels in sequence, and finally routed to the base station.

It should be noted that the IDU 200 and the ODU 100 may be set independently or combined into a Customer Premise Equipment (CPE) 300.

First, the IDU 200, as an indoor unit, is equivalent to a router, which can provide LAN or WLAN services for users, and can also provide a management server for the CPE 300, providing services such as web page management, TR069 and the like. In order to implement multiple PDN connections, the IDU 200 is provided with a second PDN management module 210 and a plurality of second application service channels 220. The second PDN management module 210 is configured for allocating at least two second VLAN interfaces to the second physical network interface according to application service requirements; monitoring whether the device dials successfully, applying for first IP addresses, and configuring routing policies for the second VLAN interfaces according to the applied first IP addresses. In addition, the plurality of second application service channels 220 are bound to the corresponding second VLAN interfaces divided from the second physical network interface by the second PDN management module 210 according to division results of the second VLAN interfaces and service requirements.

Second, the ODU 100, as an outdoor unit, is equivalent to a wireless Internet access module, which can perform 2G/3G/4G/5G wireless protocol processing, convert user data sent by the IDU 200 into radio waves and send the radio waves to a mobile communication base station, and then convert the radio waves received from the mobile communication base station into user data and forward the user data to the IDU 200. The AP 130 is an application processor, which can operate some applications on the ODU 100, such as TR069 and web server. The MODEM 140 is a modem, which can operate the 2G/3G/4G/5G wireless protocol stack, and provide services for the whole equipment to connect with the mobile communication base station. In order to implement multiple PDNs, the AP 130 is provided with a first PDN management module 131 and a plurality of first application service channels 132. The first PDN management module 131 is configured for allocating at least two first VLAN interfaces to the first physical network interface according to application service requirements, monitoring whether the device dials successfully, allocating first IP addresses to the IDU 200, and routing data messages from the IDU 200 to the MODEM 140. In addition, through the plurality of first application service channels 132, the data messages sent through the second application service channels 220 may be routed to the MODEM 140 according to division results of the first VLAN interfaces and service requirements, and some applications on the ODU 100, such as TR069 and web server are operated, such that a user can manage the ODU 100.

In addition, in order to implement multiple PDN connections, the MODEM 140 is provided with a network connection module 141 and a plurality of third application service channels 142. The network connection module 141 is configured for establishing a PDN connection with the base station and acquiring a public network IP address. The plurality of third application service channels 142 are configured for sending the data messages sent through the first application service channels 132 to corresponding PDN channels and finally to the mobile communication base station.

It should be noted that the network interfaces between the IDU 200 and the AP 130 are VLAN side network interfaces 400 virtualized from the RJ45 interfaces, and are used as data channels between the second application service channels 220 and the first application service channels 132. It can be understood that the above-mentioned second VLAN interfaces are VLAN interfaces virtualized from the RJ45 interfaces at the IDU 200 side, and the above-mentioned first VLAN interfaces are VLAN interfaces virtualized from the RJ45 interfaces at the ODU 100 side.

It should be noted that the network interfaces between the AP 130 and the MODEM 140 are WAN side network interfaces 500 enumerated after the ODU 100 successfully dials, and are used as data channels between the first application service channels 132 and the third application service channels 142. It can be understood that the above-mentioned WAN interfaces are network interfaces enumerated at the AP 130 side and used for connecting to the MODEM 140, and the above-mentioned virtual network interfaces are network interfaces generated by the MODEM 140 and used for connecting to the AP 130, where the WAN interfaces of the AP 130 are in one-to-one correspondence with the virtual network interfaces of the MODEM 140.

Figure 5:
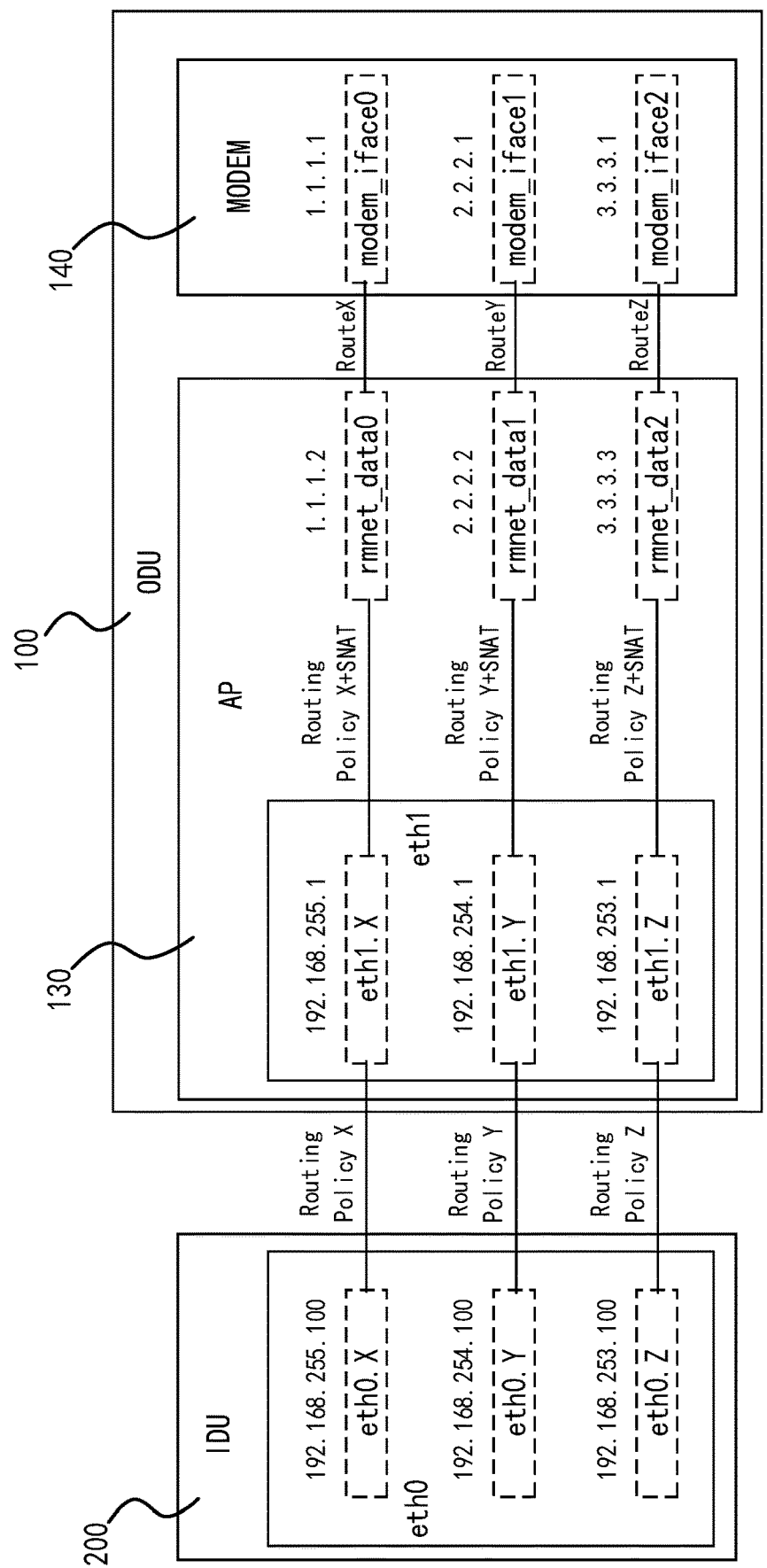
FIG. 5 is a schematic diagram of allocating private network IP addresses by an ODU to an IDU provided by an embodiment of the present disclosure.

In addition, referring to FIG. 5 and FIG. 6, in an embodiment, S400 includes, but is not limited to, a step S600.

At S600, first private network IP addresses corresponding to the PDN data channels are allocated, according to the address allocation requests, to the IDU, such that data messages from the IDU are routed to corresponding first VLAN interfaces according to the first private network IP addresses.

In an embodiment, the IDU allocates a plurality of second VLAN interfaces to the second physical network interface according to service requirements, where the second physical network interface of the IDU may refer to eth0 in FIG. 5, and the plurality of second VLAN interfaces may refer to eth0.X, eth0.Y and eth0.Z in FIG. 5. Meanwhile, the ODU allocates a plurality of first VLAN interfaces to the first physical network interface according to service requirements, where the first physical network interface of the ODU may refer to eth1 in FIG. 5, and the plurality of first VLAN interfaces may refer to eth1.X, eth1.Y and eth1.Z in FIG. 5. After the plurality of second VLAN interfaces and the plurality of first VLAN interfaces are virtualized, the ODU may allocate corresponding first private network IP addresses to the second VLAN interfaces of the IDU according to the address allocation requests corresponding to the PDN data channels from the IDU. For example, as shown in FIG. 5, the IP address of eth0.X may be configured as 192.168.255.100, the IP address of eth0.Y may be configured as 192.168.254.100, and the IP address of eth0.Z may be configured as 192.168.253.100. Then, after routing policies are configured for the second VLAN interfaces of the IDU, the data sent from the second VLAN interfaces of the IDU may be routed, according to the obtained first private network IP addresses, to corresponding first VLAN interfaces on the ODU.

It is worth noting that the second VLAN interfaces of the IDU and the first VLAN interfaces of the ODU should be synchronously divided, and tags of the first and second VLAN interfaces should be consistent, where the tags may refer to X values of eth0.X and eth1.X, Y values of eth0.Y and eth1.Y, and Z values of eth0.Z and eth1.Z in FIG. 5. In an embodiment, eth0.X of eth0 and eth1.X of eth1 are in the same network segment and have identical tags, so that eth0.x and eth1.x may communicate with each other, that is, the IDU may add a routing policy to corresponding eth0.x, to route a data message sent from eth0.x to eth1.x.

It can be understood that the IDU requests first private network IP addresses by starting a Dynamic Host Configuration Protocol (DHCP)/Point to Point Protocol over Ethernet (PPPoE)/IP over Ethernet (IPOE) client. Then, the ODU allocates the first private network IP addresses to the IDU in response to address allocation requests from the IDU by starting a DHCP/PPPOE/IPOE Server.

In addition, referring to FIG. 7, in an embodiment, the method for implementing multiple PDNs between an IDU and an ODU further includes, but not limited to, following steps S710 to S740.

At S710, public network IP address allocation requests are sent to the base station.

At S720, first public network IP addresses allocated by the base station according to the public network IP address allocation requests are acquired.

At S730, the first public network IP addresses are configured to the WAN interfaces.

At S740, routing policies are configured for the first VLAN interfaces and Source Network Address Translation (SNAT) rules are added to data messages from the first VLAN interfaces, such that data messages from the first VLAN interfaces are routed to corresponding WAN interfaces, where the SNAT rules are used to translate source network addresses of the data messages from the first VLAN interfaces into the first public network IP addresses.

In an embodiment, the ODU may judge whether a PDN connection between the device and the base station has been established and send the public network IP address allocation requests to the base station by dialing, and the base station may allocate first public network IP addresses to the ODU according to the public network IP address allocation requests. Then, the AP in the ODU may create the above WAN interfaces, such as rmnet_data0, rmnet_data1 and rmnet_data2 in FIG. 5, and configure the first public network IP addresses to the WAN interfaces. As shown in FIG. 5, the IP address of rmnet_data0 may be configured as 1.1.1.2, the IP address of rmnet_data1 may be configured as 2.2.2.2, and the IP address of rmnet_data2 may be configured as 3.3.3.3. Because the IP addresses of the first VLAN interfaces are private network IP addresses and the IP addresses of the WAN interfaces are public network IP addresses, in order to route the data messages from the first VLAN interfaces to corresponding WAN interfaces, the ODU may configure routing policies for the first VLAN interfaces and add SNAT rules to the data messages from the first VLAN interfaces, where configuring routing policies for the first VLAN interfaces enables the data messages sent from the first VLAN interface to be routed to the corresponding WAN interfaces, and adding SNAT rules to the data messages sent from the first VLAN interfaces enables source network addresses of the data messages from the first VLAN interfaces to be translated into the above-mentioned first public network IP addresses. Therefore, through the above operation, in an embodiment, a data message from eth1.x can be routed to rmnet_data0.

Figure 8:
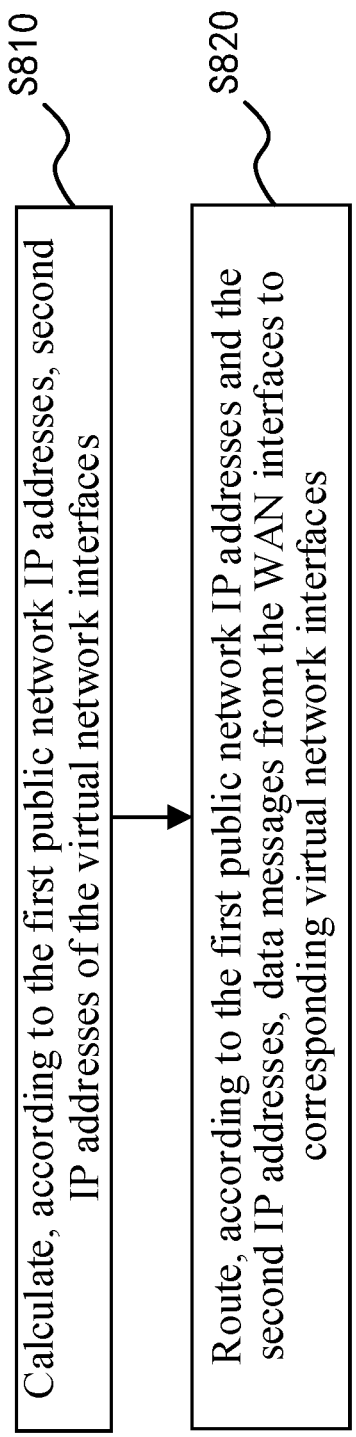
FIG. 8 is a flowchart of a method for implementing multiple PDNs between an IDU and an ODU provided by another embodiment of the present disclosure.

In addition, referring to FIG. 8, in an embodiment, the method for implementing multiple PDNs between an IDU and an ODU further includes, but not limited to, steps S810 and S820.

At S810, second IP addresses of the virtual network interfaces are calculated according to the first public network IP addresses.

At S820, data messages from the WAN interfaces are routed to corresponding virtual network interfaces according to the first public network IP addresses and the second IP addresses.

In an embodiment, after the ODU dials successfully, the MODEM may map a plurality of virtual network interfaces, such as modem_iface0, modem_iface1 and modem_iface2 shown in FIG. 5. The network interfaces are not actual physical network interfaces, but are network interfaces virtualized when establishing PDNs. The second IP addresses of the virtual network interfaces mapped by the MODEM are calculated through the first public IP addresses of the corresponding WAN interfaces according to a certain algorithm, which are equivalent to gateway addresses at the WAN side, so that the IP address of modem_iface0 is configured as 1.1.1.1, the IP address of modem_iface1 is configured as 2.2.2.1, and the IP address of modem_iface2 is configured as 3.3.3.1. Because the WAN interfaces and the corresponding virtual network interfaces are directly connected, and both the WAN interfaces and the corresponding virtual network interfaces have raw IPs, the two may do not need an Address Resolution Protocol (ARP) process, so that the data messages from the WAN interfaces can be directly routed to the corresponding virtual network interfaces. Therefore, through the above operation, in an embodiment, a data message from rmnet_data0 can be directly routed to modem_iface0.

Figure 9:
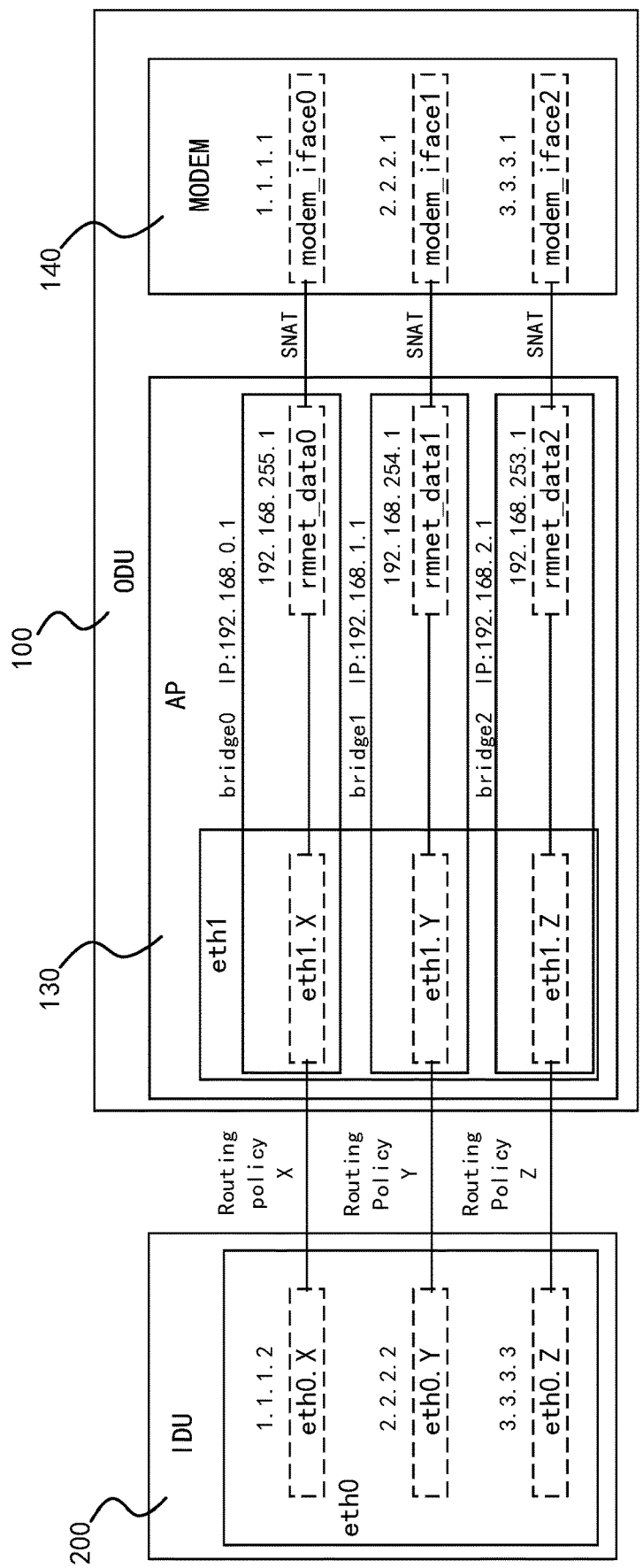
FIG. 9 is a schematic diagram of allocating public network IP addresses by an ODU to an IDU provided by an embodiment of the present disclosure.
Figure 10:
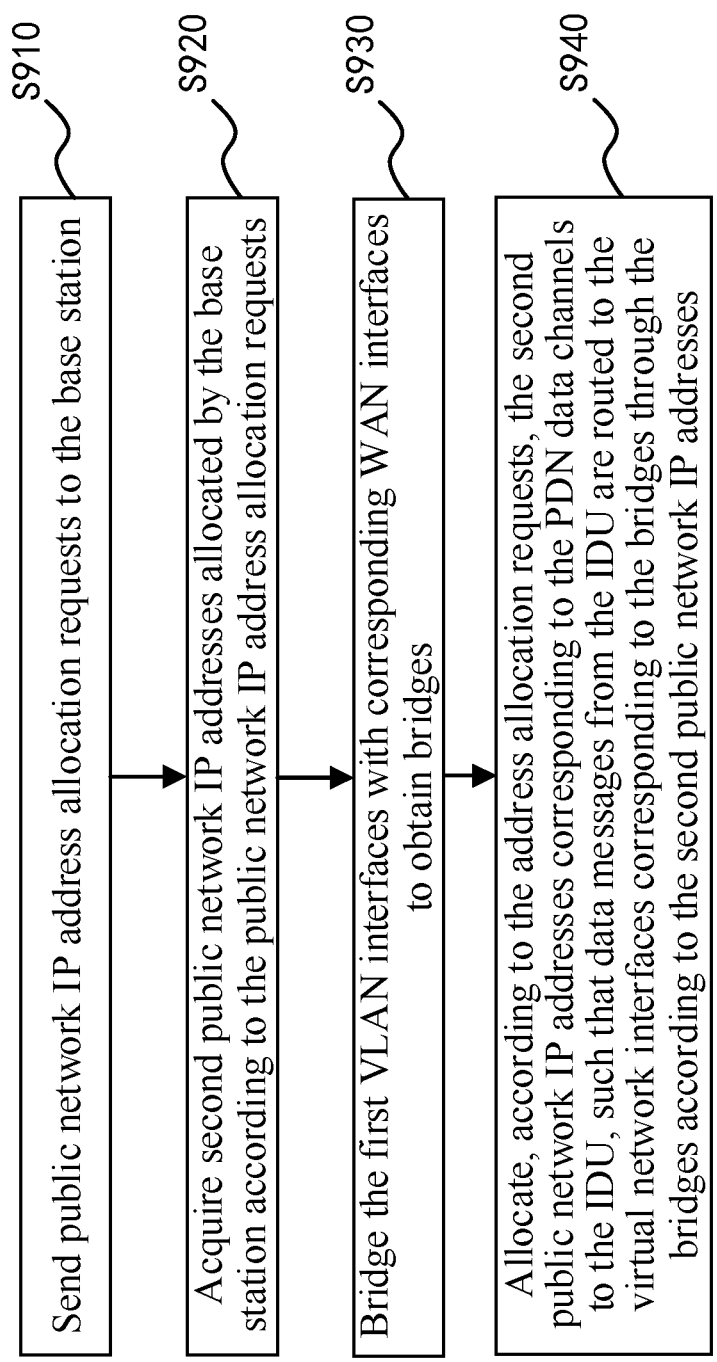
FIG. 10 is a flowchart of a method for implementing multiple PDNs between an IDU and an ODU provided by another embodiment of the present disclosure.

In addition, referring to FIG. 9 and FIG. 10, in an embodiment, S400 includes, but not limited to, step S910, step S920, step S930 and S940.

At S910, public network IP address allocation requests are sent to the base station.

At S920, second public network IP addresses allocated by the base station according to the public network IP address allocation requests are acquired.

At S930, the first VLAN interfaces are bridged with corresponding WAN interfaces to obtain bridges.

At S940, the second public network IP addresses corresponding to the PDN data channels are allocated, according to the address allocation requests, to the IDU, such that data messages from the IDU are routed to the virtual network interfaces corresponding to the bridges through the bridges according to the second public network IP addresses.

In an embodiment, the IDU allocates a plurality of second VLAN interfaces to the second physical network interface according to service requirements, where the second physical network interface of the IDU may refer to eth0 in FIG. 9, and the plurality of second VLAN interfaces may refer to eth0.X, eth0.Y and eth0.Z in FIG. 9. Meanwhile, the ODU allocates a plurality of first VLAN interfaces to the first physical network interface according to service requirements, where the first physical network interface of the ODU may refer to eth1 in FIG. 9, and the plurality of first VLAN interfaces may refer to eth1.X, eth1.Y and eth1.Z in FIG. 9. After a plurality of second VLAN interfaces and a plurality of first VLAN interfaces are virtualized, both the IDU and the ODU may judge whether the device has established a PDN connection and send public network IP address allocation requests to the base station by dialing, and the base station may allocate second public network IP addresses to the ODU according to the public network IP address allocation requests. Then, the AP in the ODU may create the above-mentioned WAN interfaces, such as rmnet_data0, rmnet_data1 and rmnet_data2 in FIG. 5, and the ODU may bridge the first VLAN interfaces on the AP with the corresponding WAN interfaces to obtain bridges, such as bridge0, bridge1 and bridge2 in FIG. 5. After a plurality of bridges are generated, the ODU may allocate the second public network IP addresses to the second VLAN interfaces of the IDU according to the address allocation requests corresponding to the PDN data channels from the IDU. For example, as shown in FIG. 9, the IP address of eth0.X may be configured as 1.1.1.2, the IP address of eth0.Y may be configured as 2.2.2.2, and the IP address of eth0.Z may be configured as 3.3.3.3. In addition, after successful dialing, the MODEM may map the plurality of virtual network interfaces, such as modem_iface0, modem_iface1 and modem_iface2 in FIG. 9. These network interfaces are not actual physical network interfaces, but are virtual network interfaces virtualized when establishing PDNs. IP addresses of the virtual network interfaces mapped by the MODEM are calculated through the corresponding second public network IP addresses according to a certain algorithm. In an embodiment, the IP address of modem_iface0 may be configured as 1.1.1.1, the IP address of modem_iface1 may be configured as 2.2.2.1, and the IP address of modem_iface2 may be configured as 3.3.3.1. Then, after routing policies are configured for the second VLAN interfaces of the IDU, the data sent from the second VLAN interfaces of the IDU may be routed, according to the obtained second public network IP addresses, to corresponding bridges on the ODU and directly routed to corresponding virtual network interfaces on the MODEM through the bridges, and then sent to the base station through the virtual network interfaces. Therefore, through the above operation, in an embodiment, a data message from eth0.X can be directly routed to modem_iface0 through bridge0.

It can be understood that the IDU requests second public network IP addresses by starting a DHCP/PPPOE/IPOE client; and then, the ODU allocates the second public network IP addresses to the IDU in response to address allocation requests from the IDU by starting a DHCP/PPPOE/IPOE Server.

It should be noted that, in the embodiment of the present disclosure, private network IP addresses may be allocated to the bridges of the ODU. In an embodiment, the IP address of bridge0 may be configured as 192.168.0.1. If an application of the web server of ODU is bound to bridge0, parameter configuration may be performed on the ODU by accessing a web UI of the ODU through 192.168.0.1 on the IDU.

Figure 11:
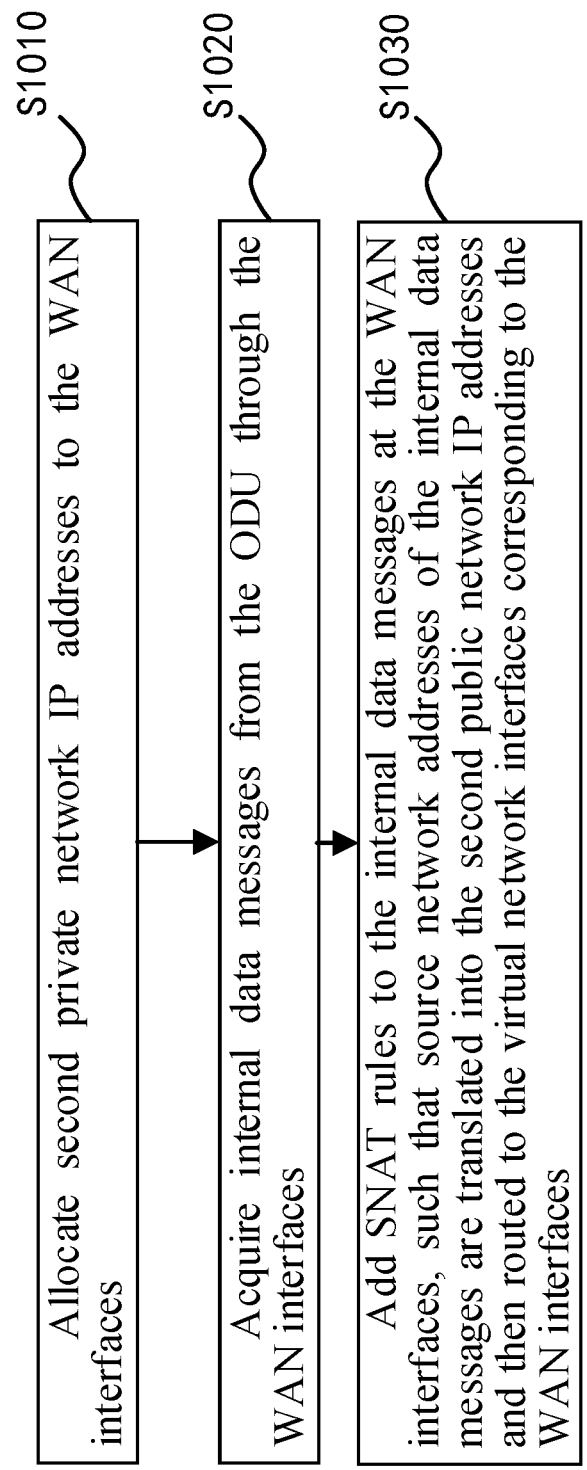
FIG. 11 is a flowchart of a method for implementing multiple PDNs between an IDU and an ODU provided by another embodiment of the present disclosure.

In addition, referring to FIG. 11, in an embodiment, the method further includes, but not limited to, step S1010, step S1020 and S1030.

At S1010, second private network IP addresses are allocated to the WAN interfaces.

At S1020, internal data messages from the ODU are acquired through the WAN interfaces.

At S1030, SNAT rules are added to the internal data messages at the WAN interfaces, such that source network addresses of the internal data messages are translated into the second public network IP addresses and then the second public network IP addresses are routed to the virtual network interfaces corresponding to the WAN interfaces.

In an embodiment, in order to enable the applications and services inside the ODU to operate normally, a second private network IP address is allocated to the rmnet_data0 at the AP side of the ODU. For example, as shown in FIG. 9, the IP address of rmnet_data0 is configured as 192.168.255.1, the IP address of rmnet_data1 is configured as 192.168.254.1, and the IP address of rmnet_data2 is configured as 192.168.253.1. Then, the WAN interfaces acquire the internal data messages of the ODU, and add SNAT rules to the internal data messages. In this way, when the internal data messages are sent from the WAN interfaces, source network addresses of the internal data messages can be translated into the second public network IP addresses and then routed to the virtual network interfaces of the MODEM, such that the internal services and applications of the ODU can be connected to the Internet normally.

Figure 12:
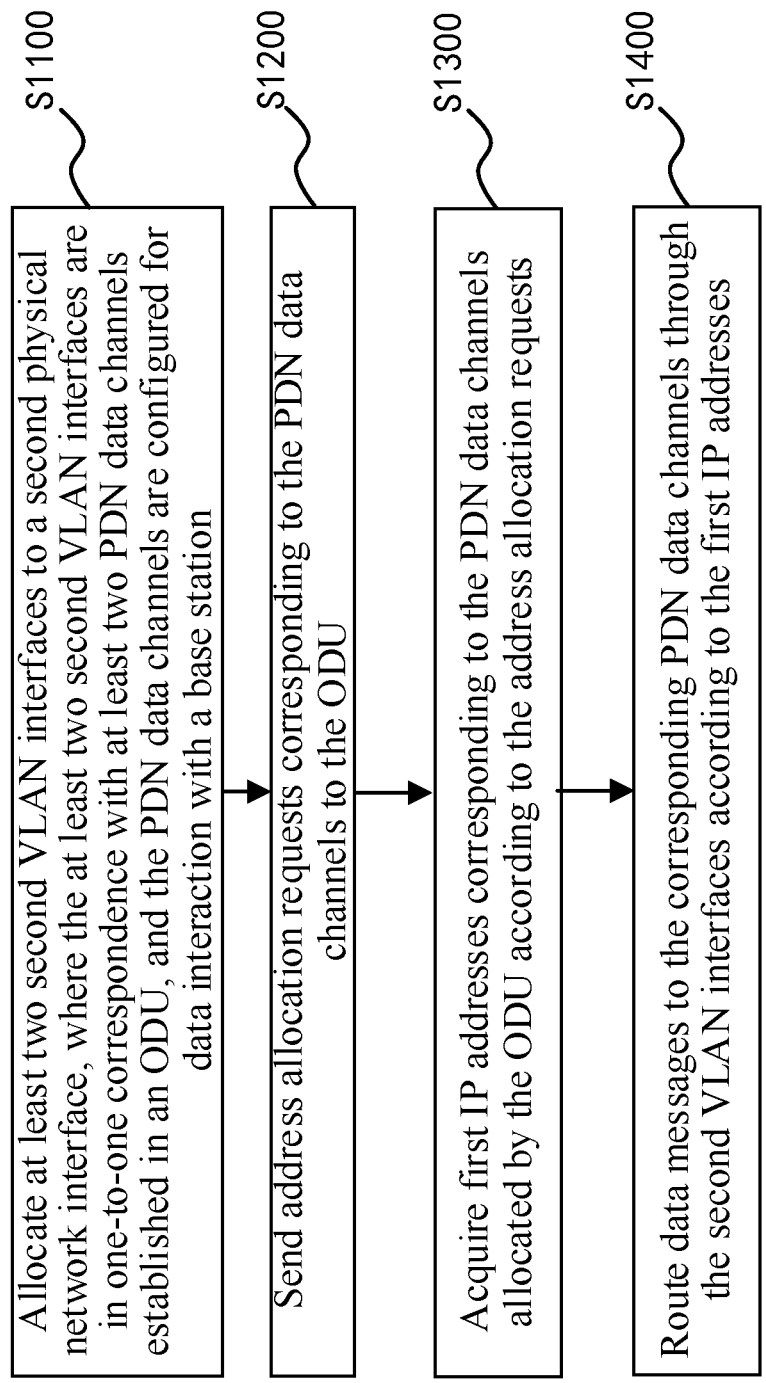
FIG. 12 is a flowchart of a method for implementing multiple PDNs between an IDU and an ODU provided by another embodiment of the present disclosure.

As shown in FIG. 12, FIG. 12 is a flowchart of a method for implementing multiple PDNs between an IDU and an ODU provided by an embodiment of the present disclosure, which may be applied to an IDU. The method includes, but not limited to, step S1100, step S1200, step S1300 and S1400.

At S1100, at least two second VLAN interfaces are allocated to a second physical network interface, where the at least two second VLAN interfaces are in one-to-one correspondence with at least two PDN data channels established in an ODU, and the PDN data channels are configured for data interaction with a base station.

At S1200, address allocation requests corresponding to the PDN data channels are sent to the ODU.

At S1300, first IP addresses corresponding to the PDN data channels allocated by the ODU according to the address allocation requests are acquired.

At S1400, data messages are routed to the corresponding PDN data channels through the second VLAN interfaces according to the first IP addresses.

In an embodiment, the IDU is configured for running various application services and providing LAN or WLAN services for the downstream, to realize data processing and services. A second physical network interface on the IDU is configured for connecting with the ODU. The ODU is configured for 2G/3G/4G wireless protocol processing, and receives user data sent by the IDU through a first physical network interface corresponding to the second physical network interface. Then, the ODU converts the user data into radio waves and send the radio waves to a mobile communication base station, and converts the radio waves received from the mobile base station into user data and then forwards the user data to the IDU through the first physical network interface corresponding to the second physical network interface. In the embodiment of the present disclosure, in order to implement multiple PDN connections between the IDU and then ODU, the IDU may first virtualize its own second physical network interface into a plurality of second VLAN interfaces to perform multiple PDN connections with the ODU. In addition, the ODU may first virtualize its own first physical network interface into a plurality of first VLAN interfaces to perform multiple PDN connections with the IDU. Then, the ODU may also establish PDN data channels that are in one-to-one correspondence with the first VLAN interfaces. As the number of the first VLAN interfaces is set to be multiple, the ODU may establish multiple PDN data channels correspondingly. As the first VLAN interfaces are in one-to-one correspondence with the second VLAN interfaces, the PDN data channels are also in one-to-one correspondence with the second VLAN interfaces. After the second VLAN interfaces, the first VLAN interfaces and the PDN data channels are generated, the IDU may send address allocation requests to the ODU through the second VLAN interfaces. Then, the ODU may allocate first IP addresses corresponding to the PDN data channels to the second VLAN interfaces of the IDU according to the address allocation requests from the IDU, and then data messages from the second VLAN interfaces of the IDU may be routed to the corresponding PDN data channels in the ODU according to the corresponding first IP addresses and routed to the base station through the PDN data channels. Therefore, the embodiment of the present disclosure may implement multiple PDN connections between the DU and the ODU with one physical network interface.

It is worth noting that for the implementations and corresponding technical effects of the method for implementing multiple PDNs between an IDU and an ODU in the embodiment of the present disclosure, reference may be made to the embodiments of the above method for implementing multiple PDNs between an IDU and an ODU correspondingly.

Figure 13:
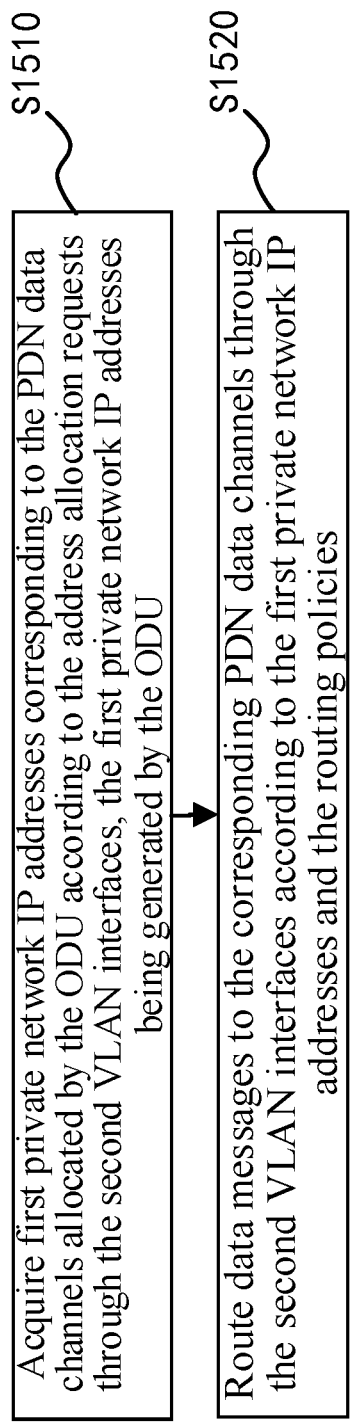
FIG. 13 is a flowchart of a method for implementing multiple PDNs between an IDU and an ODU provided by another embodiment of the present disclosure.

As shown in FIG. 13, FIG. 13 is a flowchart of a method for implementing multiple PDNs between an IDU and an ODU provided by an embodiment of the present disclosure. S1300 includes, but not limited to, to step S1510. Accordingly, S1400 includes, but not limited to, a step S1520.

At S1510, first private network IP addresses corresponding to the PDN data channels allocated by the ODU according to the address allocation requests are acquired through the second VLAN interfaces, where the first private network IP addresses are generated by the ODU.

At S1520, data messages are routed to the corresponding PDN data channels through the second VLAN interfaces according to the first private network IP addresses and routing policies.

It is worth noting that for the implementations and corresponding technical effects of the method for implementing multiple PDNs between an IDU and an ODU in the embodiment of the present disclosure, reference may be made to the embodiments of the above-mentioned method for implementing multiple PDNs between an IDU and an ODU correspondingly.

Figure 14:
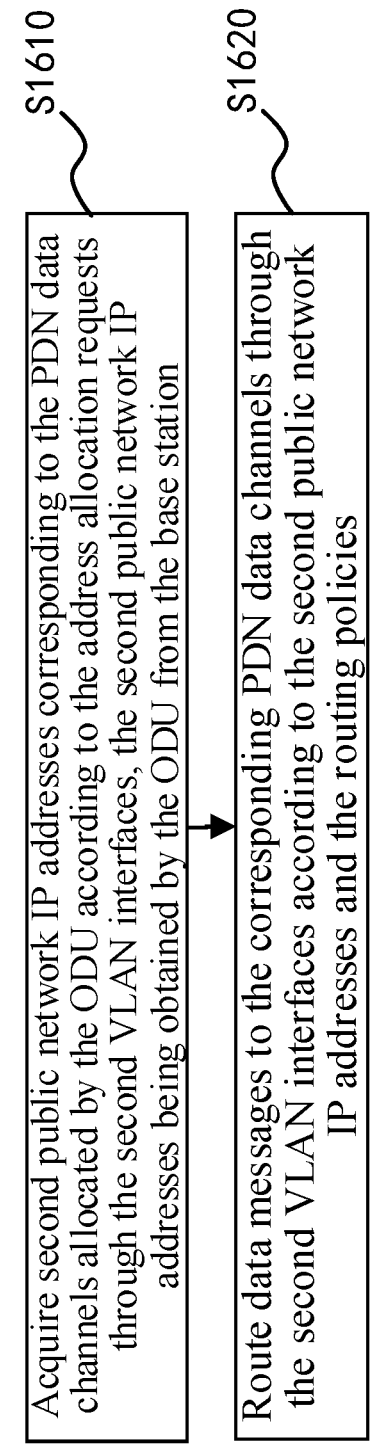
FIG. 14 is a flowchart of a method for implementing multiple PDNs between an IDU and an ODU provided by another embodiment of the present disclosure.

As shown in FIG. 14, FIG. 14 is a flowchart of a method for implementing multiple PDNs between an IDU and an ODU provided by an embodiment of the present disclosure. S1300 includes, but not limited to, a step S1610. Accordingly, S1400 includes, but not limited to, a step S1620.

At S1610, second public network IP addresses corresponding to the PDN data channels allocated by the ODU according to the address allocation requests are acquired through the second VLAN interfaces, where the second public network IP addresses are obtained by the ODU from the base station.

At S1620, data messages are routed to the corresponding PDN data channels through the second VLAN interfaces according to the second public network IP addresses and the routing policies.

It is worth noting that for the implementations and corresponding technical effects of the method for implementing multiple PDNs between an IDU and an ODU in the embodiment of the present disclosure, reference may be made to the embodiments of the above-mentioned method for implementing multiple PDNs between an IDU and an ODU correspondingly.

Based on the above-mentioned method for implementing multiple PDNs between an IDU and an ODU, various embodiments of the ODU, IDU and a computer readable storage medium of the present disclosure are proposed below.

In addition, an embodiment of the present disclosure provides an ODU. The ODU includes: a memory, a processor, and a computer program stored in the memory and executable by the processor.

The processor and the memory may be connected by a bus or other means.

It should be noted that the ODU in this embodiment may be applied to the system architecture platform in the embodiment shown in FIG. 1. The ODU in this embodiment may form a part of the system architecture platform in the embodiment shown in FIG. 1. The two both belong to the same inventive concept, and therefore have the same implementation principle and technical effect, which will not be described in detail herein.

The non-transient software program and instructions required to implement the method for implementing multiple PDNs between an IDU and an ODU in the above embodiment are stored in the memory which, when executed by the processor, cause the processor to perform the method for implementing multiple PDNs between an IDU and an ODU in the above embodiment, for example, perform the above-described steps S100 to S400 in FIGS. 2, S510 to S520 in FIG. 4, S600 in FIGS. 6, S710 to S740 in FIGS. 7, S810 to S820 in FIGS. 8, S910 to S940 in FIG. 10, and S1010 to S1030 in FIG. 11.

In addition, an embodiment of the present disclosure further provides an IDU. The IDU includes: a memory, a processor, and a computer program stored in the memory and executable by the processor.

The processor and the memory may be connected by a bus or other means.

It should be noted that the IDU in this embodiment may be applied to the system architecture platform in the embodiment shown in FIG. 1. The IDU in this embodiment may form a part of the system architecture platform in the embodiment shown in FIG. 1. The two both belong to the same inventive concept, and therefore have the same implementation principle and technical effect, which will not be described in detail herein.

The non-transient software program and instructions required to implement the method for implementing multiple PDNs between an IDU and an ODU in the above embodiment are stored in the memory which, when executed by the processor, cause the processor to perform the method for implementing multiple PDNs between an IDU and an ODU in the above embodiment, for example, perform the steps S1100 to S1400 in FIGS. 12, S1510 to S1520 in FIG. 13, and S1610 to S1620 in FIG. 14.

The device embodiments described above are merely illustrative, and the units described as separate components may or may not be physically separated, that is, may be located in one place, or may be distributed onto multiple network elements. Some or all of the modules may be selected according to actual needs to achieve the purpose of the embodiment.

In addition, an embodiment of the present disclosure further provides a computer-readable storage medium storing a computer executable instruction which, when executed by a processor, causes the processor to implement the above method for implementing multiple PDNs. For example, the computer executable instruction, when executed by a processor in the above ODU embodiments, causes the processor to implement the method for implementing multiple PDNs in the above embodiments, for example, implement the steps S1010 to S400 in FIG. 2, S510 to S520 in FIG. 4, S600 in FIG. 6, S710 to S740 in FIG. 7, S810 to S820 in FIG. 8, S910 to S99 in FIG. 10, and S1010 to S1030 in FIG. 11. For another example, the computer executable instruction, when executed by a processor in the above IDU embodiments, causes the processor to implement the method for implementing multiple PDNs in the above embodiments, for example, implement the steps S1100 to S1400 in FIG. 12, S1510 to S1520 in FIG. 13, and S1610 to S1620 in FIG. 14.

An embodiment of the present invention includes: allocating, by an ODU, at least two first VLAN interfaces to a first physical network interface, and establishing PDN data channels that are in one-to-one correspondence with the first VLAN interfaces, where the PDN data channels are configured for data interaction with a base station; and acquiring, by the ODU, address allocation requests corresponding to the PDN data channels from an IDU, and allocating first IP addresses corresponding to the PDN data channels to the IDU according to the address allocation requests, such that data messages from the IDU are routed to the corresponding PDN data channels according to the first IP addresses. According to a scheme provided by the embodiment of the present disclosure, the ODU may divide its own first physical network interface into a plurality of first VLAN interfaces, and then establish PDN data channels that are in one-to-one correspondence with the first VLAN interfaces. Because the number of the first VLAN interfaces is multiple, a plurality of PDN data channels may be established. After the ODU allocates a plurality of first IP addresses that are in one-to-one correspondence with the PDN data channels to the IDU, data messages from the IDU may be routed to the corresponding PDN data channels in the IDU according to different first IP addresses, and then routed to the base station through the PDN data channels. Therefore, the embodiment of the present disclosure can implement multiple PDN connections between the IDU and the ODU with one physical network interface.

As will be understood by those having ordinary skills in the art that all or some of the steps, and systems in the method disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those having ordinary skills in the art, the term computer storage medium includes volatile and non-volatile, removable and non-removable media implemented in any method or technology for storing information such as computer readable instructions, data structures, program modules or other data. A computer storage medium may include RAM, ROM, EEPROM, flash memory or other memory technologies, CD-ROM, digital versatile disk (DVD) or other optical disk storage, magnetic cassette, magnetic tape, magnetic disk storage or other magnetic storage devices, or any other media that can be used to store desired information and can be accessed by a computer. In addition, it is well known to those having ordinary skills in the art that the communication medium may generally include computer readable instructions, data structures, program modules or other data in a modulated data signal such as a carrier wave or other transmission mechanism, and may include any information delivery medium.

The above is a detailed description of some implementations of the present disclosure, but the present disclosure is not limited thereto. Those having ordinary skills in the art can also make various equivalent modifications or substitutions without violating the sharing conditions of the scope of the present disclosure, and these equivalent modifications or substitutions are included in the scope defined by the claims of the present disclosure.

What is claimed is:

1. A method for implementing multiple PDNs between an indoor unit (IDU) and an outdoor unit (ODU), applied to the ODU, the method comprising:
   allocating at least two first Virtual Local Area Network (VLAN) interfaces to a first physical network interface;
   establishing packet data network (PDN) data channels which are in one-to-one correspondence with the first VLAN interfaces, wherein the PDN data channels are configured for data interaction with a base station;
   acquiring address allocation requests corresponding to the PDN data channels from the IDU; and
   allocating first IP addresses corresponding to the PDN data channels to the IDU according to the address allocation requests, such that data messages from the IDU are routed to the corresponding PDN data channels according to the first Internet Protocol (IP) addresses;
   wherein the ODU comprises an application processor (AP) and a modem (MODEM), and the first physical network interface is arranged on the AP;
   wherein establishing the PDN data channels which are in one-to-one correspondence with the first VLAN interfaces comprises:
      enumerating, by the AP, according to the first VLAN interfaces, Wide Area Network (WAN) interfaces which are in one-to-one correspondence with the first VLAN interfaces, and generating, by the MODEM, virtual network interfaces which are in one-to-one correspondence with the WAN interfaces; and
      establishing, according to the first VLAN interfaces, the WAN interfaces and the virtual network interfaces, the PDN data channels which are in one-to-one correspondence with the first VLAN interfaces.

2. The method of claim 1, wherein allocating first IP addresses corresponding to the PDN data channels to the IDU according to the address allocation requests, such that data messages from the IDU are routed to the corresponding PDN data channels according to the first IP addresses comprises:
   allocating, according to the address allocation requests, first private network IP addresses corresponding to the PDN data channels to the IDU, such that data messages from the IDU are routed to the corresponding first VLAN interfaces according to the first private network IP addresses.

3. The method of claim 2, further comprising:

sending public network IP address allocation requests to a base station;

acquiring first public network IP addresses allocated by the base station according to the public network IP address allocation requests;

configuring the first public network IP addresses to the WAN interfaces; and configuring routing policies for the first VLAN interfaces and adding Source Network Address Translation (SNAT) rules to data messages from the first VLAN interfaces, such that the data messages from the first VLAN interfaces are routed to corresponding WAN interfaces, wherein the SNAT rules are configured to translate source network addresses of the data messages from the first VLAN interfaces into the first public network IP addresses.

4. The method of claim 3, further comprising:

calculating, according to the first public network IP addresses, second IP addresses of the virtual network interfaces; and routing, according to the first public network IP addresses and the second IP addresses, data messages from the WAN interfaces to corresponding virtual network interfaces.

5. The method of claim 1, wherein allocating first IP addresses corresponding to the PDN data channels to the IDU according to the address allocation requests, such that data messages from the IDU are routed to the corresponding PDN data channels according to the first IP addresses comprises:

sending public network IP address allocation requests to a base station;

acquiring second public network IP addresses allocated by the base station according to the public network IP address allocation requests;

bridging the first VLAN interfaces with corresponding WAN interfaces to obtain bridges; and allocating, according to the address allocation requests, the second public network IP addresses corresponding to the PDN data channels to the IDU, such that data messages from the IDU are routed to the virtual network interfaces corresponding to the bridges through the bridges according to the second public network IP addresses.

6. The method of claim 5, further comprising:

allocating second private network IP addresses to the WAN interfaces;

acquiring internal data messages from the ODU through the WAN interfaces; and adding SNAT rules to the internal data messages at the WAN interfaces, such that source network addresses of the internal data messages are translated into the second public network IP addresses and then routed to the virtual network interfaces corresponding to the WAN interfaces.

7. A non-transitory computer readable storage medium storing a computer executable instruction which, when executed by a processor, causes the processor to perform a method for implementing multiple PDNs between an indoor unit (IDU) and an outdoor unit (ODU), applied to the ODU, the method comprising:

allocating at least two first Virtual Local Area Network (VLAN) interfaces to a first physical network interface;

establishing packet data network (PDN) data channels which are in one-to-one correspondence with the first VLAN interfaces, wherein the PDN data channels are configured for data interaction with a base station;

acquiring address allocation requests corresponding to the PDN data channels from the IDU; and allocating first IP addresses corresponding to the PDN data channels to the IDU according to the address allocation requests, such that data messages from the IDU are routed to the corresponding PDN data channels according to the first Internet Protocol (IP) addresses;

wherein the ODU comprises an application processor (AP) and a modem (MODEM), and the first physical network interface is arranged on the AP;

wherein establishing the PDN data channels which are in one-to-one correspondence with the first VLAN interfaces comprises:

enumerating, by the AP, according to the first VLAN interfaces, Wide Area Network (WAN) interfaces which are in one-to-one correspondence with the first VLAN interfaces, and generating, by the MODEM, virtual network interfaces which are in one-to-one correspondence with the WAN interfaces; and establishing, according to the first VLAN interfaces, the WAN interfaces and the virtual network interfaces, PDN data channels which are in one-to-one correspondence with the first VLAN interfaces.

* * * * *